(12) United States Patent
Kuramochi et al.

(10) Patent No.: US 6,292,301 B1
(45) Date of Patent: Sep. 18, 2001

(54) OPTICAL VIEWING SYSTEM FOR USE IN HEAD-MOUNTED DISPLAY

(75) Inventors: Junko Kuramochi, Ninomiya-machi; Atsushi Okuyama, Tokorozawa, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/335,497

(22) Filed: Jun. 18, 1999

(30) Foreign Application Priority Data

Jun. 19, 1998 (JP) .................................................. 10-189921
Jun. 16, 1999 (JP) .................................................. 11-170223

(51) Int. Cl.[7] .............................. G02B 27/14; G09G 5/00
(52) U.S. Cl. ........................ 359/631; 359/630; 359/637; 345/8
(58) Field of Search ...................................... 359/630, 631, 359/632, 633, 634, 636, 637; 345/8; 353/28

(56) References Cited

U.S. PATENT DOCUMENTS

| | | | |
|---|---|---|---|
| 5,546,373 | 8/1996 | Koyama | 369/120 |
| 5,594,588 | 1/1997 | Togino | 359/631 |
| 5,689,736 | 11/1997 | Okuyama et al. | 396/51 |
| 5,706,136 | 1/1998 | Okuyama et al. | 359/630 |
| 5,737,113 | 4/1998 | Kuramochi et al. | 359/259 |
| 5,746,939 | 5/1998 | Taniguchi et al. | 252/299.01 |
| 5,815,741 | 9/1998 | Okuyama et al. | 396/51 |

FOREIGN PATENT DOCUMENTS

| | | | |
|---|---|---|---|
| 58-078116 | 5/1983 | (JP) | G02B/27/02 |
| 3-180810 | 8/1991 | (JP) | G02B/17/08 |
| 5-303054 | 11/1993 | (JP) | G02B/27/02 |
| 5-303055 | 11/1993 | (JP) | G02B/27/02 |
| 5-303056 | 11/1993 | (JP) | G02B/27/02 |
| 5-323229 | 12/1993 | (JP) | G02B/27/02 |

*Primary Examiner*—Georgia Epps
*Assistant Examiner*—David N. Spector
(74) *Attorney, Agent, or Firm*—Fitzpatrick, Cella, Harper & Scinto

(57) ABSTRACT

An optical system having a first optical acting surface and a second optical acting surface in an optical path between a focal plane and a stop. In the optical path traced from the focal plane to the stop, light emitted from the focal plane is reflected by the second optical acting surface and thereafter reflected by the first optical acting surface to reach the stop. A ray connecting a center of the focal plane with a center of the stop via the first optical acting surface and the second optical acting surface is defined as a reference axis ray. The second optical acting surface is of a rotationally asymmetric, aspherical shape only one symmetry plane of which is a plane including the reference axis ray.

8 Claims, 7 Drawing Sheets

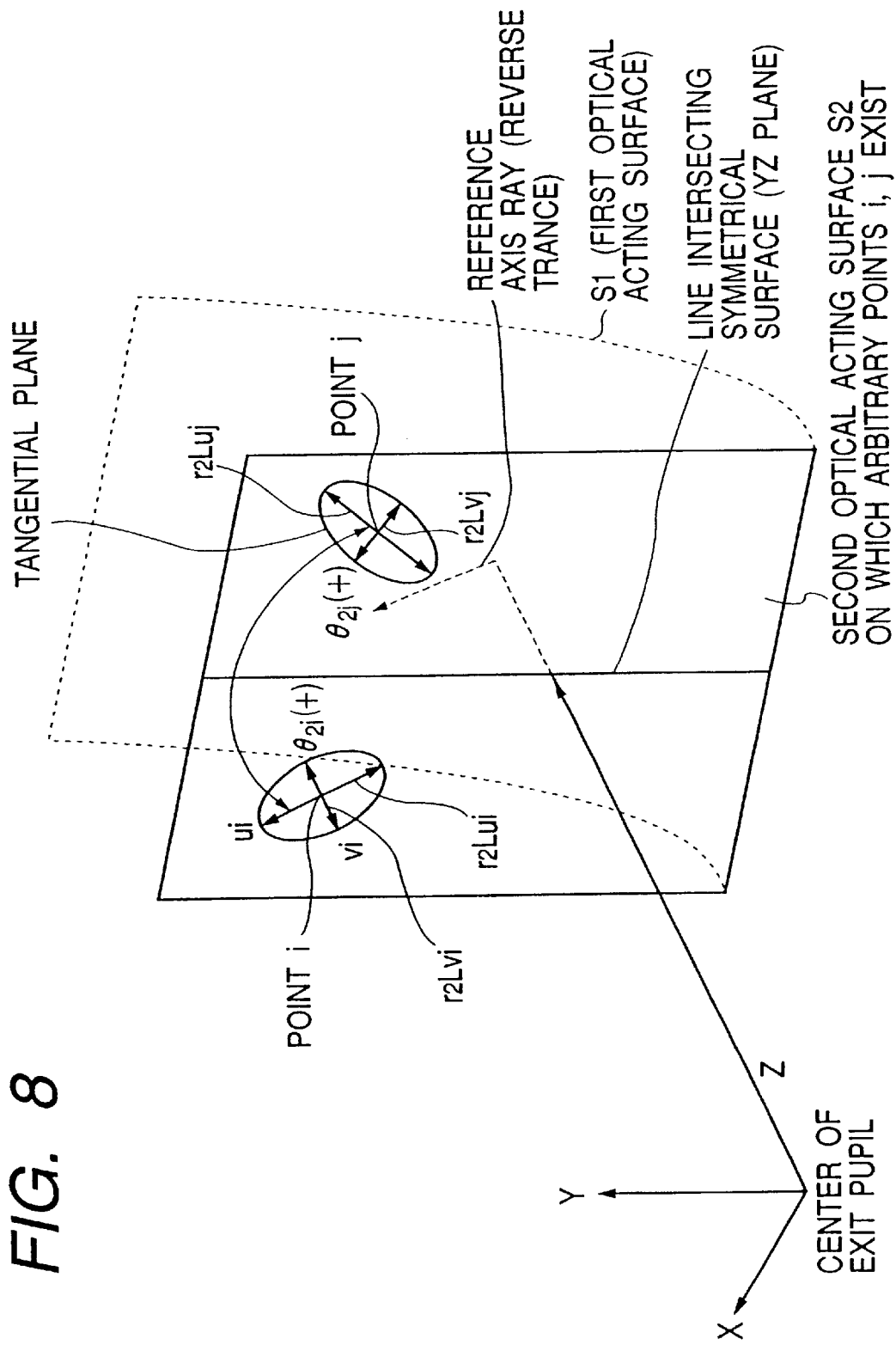

OPTICAL VIEWING SYSTEM FOR USE IN HEAD-MOUNTED DISPLAY

BACKGROUND OF THE INVENTION

1. Field of the Invention

The present invention relates to an optical system and, more particularly, to an optical system suitably applicable to use in image viewing apparatuses, such as viewfinders of cameras, so-called head-mounted displays, or the like, and in image pickup apparatuses, such as camera or the like.

2. Related Background Art

For the head-mounted display etc., various optical systems have been devised heretofore for making compact the overall apparatus.

For example, Japanese Laid-open Patent Application No. 58-78116 discloses an optical apparatus for a viewer to view an object image on a primary image plane, obtained by a photographing optical system, through an optical element of a prism shape having a concave, spherical reflecting surface inclined with respect to the eye of the viewer.

Since in this conventional example the reflecting surface is an inclined, spherical surface, it is difficult to correct optical aberrations such as astigmatism etc. occurring threat into good order. The above Japanese application describes the necessity for addition of a new lens system for improving the aberrations.

Japanese Laid-open Patent Application No. 5-303055 (the Japanese counterpart of U.S. Pat. No. 5,594,588) discloses an apparatus additionally including such a lens system (relay lens system). The addition of such a relay lens system, however, involves the disadvantages of increasing the total length of the optical system and degrading the compactification of the optical system.

In order to improve the compactification and the aberrations of the optical system, Japanese Laid- open Patent Applications No. 5-303054, No. 5-303056 (the Japanese counterpart of USP No. 5,594,588), and No. 5-323229 disclose optical systems in which the reflecting surface is one reflecting surface comprised of a general, rotationally asymmetric surface having higher-order aspherical terms, a paraboloid of revolution or an ellipsoid of revolution according to a conical function defined by a conical coefficient, or a toric, aspherical surface (or an anamorphic, aspherical surface) represented by different aspherical functions on the orthogonal coordinate axes respectively and is inclined with respect to the optical axis of the viewer's eye.

The optical systems of the structures having the reflecting surface of such one aspherical surface, however, had the drawback of incapability of sufficiently correcting all of deformation of image (distortion), curvature of field, and difference between foci in orthogonal directions (astigmatism).

In the case of the so-called decentering optical systems with the reflecting surface thus inclined, optical performance will vary greatly if focus adjustment (diopter adjustment) of the optical system is effected by moving the optical system. Therefore, a desired method for the focus adjustment is one for adjusting the focus by moving the focal plane of the optical system (an image display element or an image pickup element). For that, it is desirable to make the optical system telecentric with respect to the focal plane.

Let us check the conventional examples described above from these viewpoints. In Japanese Laid-open Patent Application No. 5-303054 correction is made for astigmatism and distortion but curvature of field still remains without being corrected.

In Japanese Laid-open Patent Application No. 5-323229, correction is made for curvature of field, astigmatism, and distortion, but angles of rays are inclined largely with respect to the focal plane. If a display element or an image pickup element such as a liquid crystal panel, a CCD, or the like is placed on the focal plane there will arise a drawback of considerable degradation of performance due to angular dependence of characteristics of these elements.

In the optical systems suggested in these applications, though distortion is corrected, deformation of the image is of a level in which is can be discriminated at a glance and thus the correction is not sufficient.

As described above, the structures with the reflecting surface of one aspherical surface had the drawback of incapability of sufficiently correcting all the aberrations.

Further, Japanese Laid-open Patent Application No. 3-180810 discloses an optical system in which distortion of the image plane is corrected by an aspherical surface having cross terms (xy etc.) of the orthogonal coordinate system (x, y, z) while the visual point of the viewer is moved away from the optical system to increase FNo to the optical system and increase the depth of focus of the optical system.

This optical system, however, is based on the method for viewing the image from the distant visual point and, therefore, cannot be constructed in a wide angle or large screen configuration. Although the optical system is constructed in the telephoto type by combining a convex mirror with a concave mirror, the overall size is large. Therefore, the optical system had the drawback of incapability of being constructed in compact structure.

SUMMARY OF THE INVENTION

An object of the present invention is, therefore, to provide an image viewing optical system that is corrected well for various aberrations and has a high angle of view while being constructed in very simple structure and that permits good viewing of information of an image displayed on a display surface of image display means when used as a viewing system.

For accomplishing the above object, optical systems of various aspects according to the present invention are characterized by comprising the following in an optical path between a focal plane and a stop:

a first optical acting surface; and
a second optical acting surface,
wherein, in an optical path traced from said focal plane to said stop, light emitted from said focal plane is reflected by said second optical acting surface and thereafter reflected by said first optical acting surface to reach said stop.

Here, a ray connecting a center of said focal plane with a center of said stop via said first optical acting surface and second optical acting surface is defined as a reference axis ray, said center of the stop is defined as an origin, an axis including a line segment extending from said origin, out of said reference axis ray traced from the origin to the center of said focal plane, is defined as a Z-axis (a positive direction of which is a direction extending from said origin to said optical system), and an axis perpendicular to said Z-axis in a plane including said reference axis ray is defined as a Y-axis (a positive direction of which is a direction including a component of a direction in which said reference axis ray traced from said origin to the center of said focal plane is bent by said first optical acting surface).

In one aspect of the present invention, the second optical acting surface is of a rotationally asymmetric, aspherical shape only one symmetry plane of which is a plane including said reference axis ray, and satisfies at least one of the following conditions (A), (B), and (C).

$$1.0 \leq r2Lui/r2Lvi \leq 12.0 \qquad (A)$$

where an azimuth direction in which an absolute value of a local curvature radius is maximum, out of local curvature radii in all azimuth directions in a tangent plane around a normal to the tangent plane on an arbitrary point i in a ray effective range of said second optical acting surface, is defined as a ui axis, an azimuth direction normal to the ui axis is defined as a vi axis, a local curvature radius in the direction of said ui axis at said arbitrary point i is defined as r2Lui, and a local curvature radius in the direction of said vi axis as r2Lvi.

(B) When an angle of the ui axis with respect to said symmetry plane is θ2i, absolute values of the θ2i increase monotonically from the near side to the far side with respect to said symmetry plane at arbitrary points on an intersecting line between the second optical acting surface and a plane being normal to said symmetry plane and including said Z-axis or being parallel to said Z-axis.

(C) The θ2i satisfies the following relation;

$$0° \leq \theta 2i \leq 35°$$

provided that r2Lui/r2Lvi=1 and θ2i=0° if there exist two or more azimuth directions in which the absolute value of the local curvature radius is maximum and that said θ2i is positive in a clockwise direction on the right side of said symmetry plane while being positive in a counterclockwise direction on the left side of said symmetry plane where said second optical acting surface is viewed from the origin side with the positive direction of said Y-axis up.

In an optical system according to another aspect of the present invention, the first optical acting surface is of a rotationally asymmetric, aspherical shape only one symmetry plane of which is a plane including said reference axis ray, and satisfies at least one of the following conditions (D), (E), and (F).

$$1.0 \leq r1Lui/r1Lvi \leq 2.0 \qquad (D)$$

where an azimuth direction in which an absolute value of a local curvature radius is maximum, out of local curvature radii in all azimuth directions in a tangent plane around a normal to the tangent plane on an arbitrary point i in a ray effective range of said first optical acting surface, is defined as a ui axis, an azimuth direction normal to the ui axis is defined as a vi axis, a local curvature radius in the direction of said ui axis at said arbitrary point i is defined as r1Lui, and a local curvature radius in the direction of said vi axis as r1Lvi.

(E) When an angle of the ui axis with respect to said symmetry plane is θ1i, absolute values of the θ1i increase monotonically from the near side to the far side with respect to said symmetry plane at arbitrary points on an intersecting line between the first optical acting surface and a plane being normal to said symmetry plane and including said Z-axis or being parallel to said Z-axis.

(F) The θ1i satisfies the following relation;

$$0° \leq \theta 1i \leq 21°$$

provided that r1Lui/r1Lvi=1 and θ1i=0° if there exist two or more azimuth directions in which the absolute value of the local curvature radius is maximum and that said θ1i is positive in a clockwise direction on the right side of said symmetry plane while being positive in a counterclockwise direction on the left side of said symmetry plane where said first optical acting surface is viewed from the origin side with the positive direction of said Y-axis up.

An optical device of the present invention is characterized by comprising the optical system of the present invention.

The other embodiments and modifications of the present invention will become apparent in the description of embodiments which follows.

BRIEF DESCRIPTION OF THE DRAWINGS

FIG. 8 is a diagram for explaining the XYZ coordinate system and signs of θi.

DETAILED DESCRIPTION OF THE PREFERRED EMBODIMENTS

Figure 1:
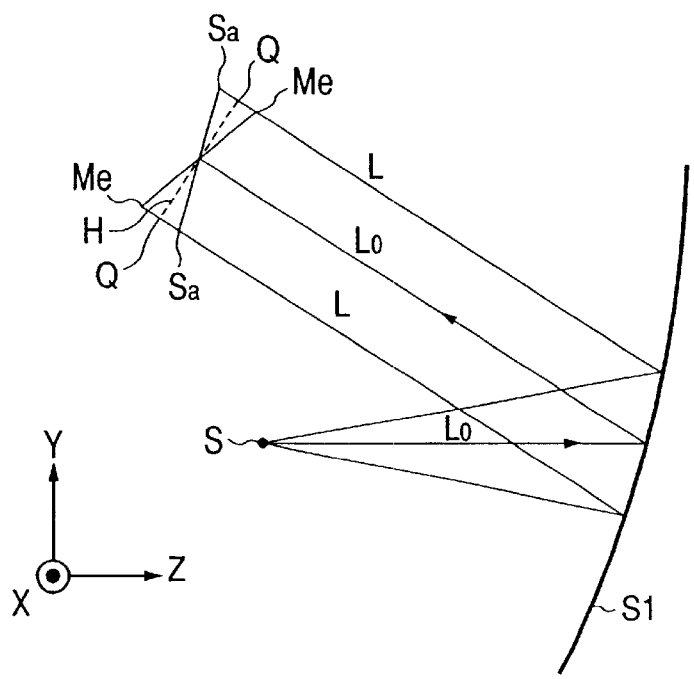
FIG. 1 is a diagram to explain the optical action of the optical system according to the present invention.
Figure 2:
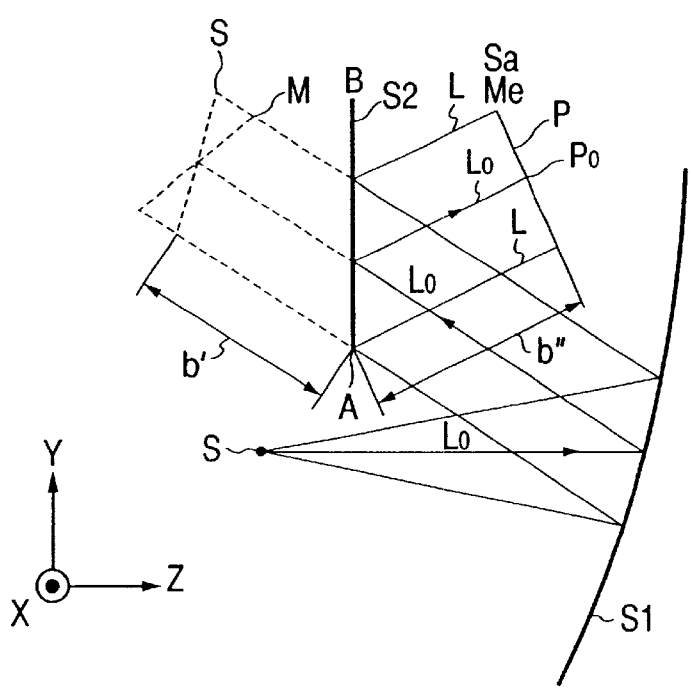
FIG. 2 is a diagram to explain the optical action of the optical system according to the present invention.

The optical action of the basic structure of the optical system according to the present invention will be described referring to FIG. 1 and FIG. 2. FIG. 1 and FIG. 2 show an application where the optical system is used as an image viewing optical system. In the figures, S represents a desired pupil position of a viewer (or a stop position), S1 a first reflecting surface (optical acting surface), and S2 a second reflecting surface (optical acting surface). Each of these optical acting surfaces S1, S2 is comprised of a smooth surface. Placed at P is a display surface of image display means (display device) as a focal plane.

The following description of the optical system will be given with a system in which light is emitted from the side of the pupil S and travels up to the display surface P for convenience' sake, but it is noted that in the case of the actual image viewing optical systems etc., the light is emitted from the display surface P and then is incident to the pupil S.

In the optical system of FIG. 1 and FIG. 2, the reference axis Lo is defined on a ray traveling along an optical path connecting the center Po of the display surface P with the center of the pupil S through the optical system. Further, principal rays L are rays each traveling along an optical path connecting a point on the display surface P with the center of the pupil S.

As illustrated in FIG. 1, the first reflecting surface S1 is determined in such a shape that the principal rays L from the pupil S become almost telecentric toward the image side by reflection at the first reflecting surface S1 and that an average image plane is almost superimposed on a plane H normal to the reference axis ray Lo.

Here, the average image plane is defined as follows. When a beam emitted from an object substantially at infinity and passing through the pupil S is considered separately in a section including the reference axis ray Lo in the plane of the drawing (which is the YZ section described hereinafter) and in a section being normal to the plane of the drawing and including the reference axis ray Lo (which is the XZ section described hereinafter), the average image plane is a plane including intermediate points between image positions of rays in the respective sections.

In FIG. 1, with a beam at a certain angle of view, points Me are image points of rays in the YZ section and points Sa are image points of rays in the XZ section At this time middle points Q between the points Me and the points Sa of the principal rays L are points on the average image plane and the difference between the points Me and the points Sa is the astigmatism. The telecentricity of principal rays and the distortion of image are affected by the general shape of the reflecting surface, whereas the imaging state of each beam (the image plane and astigmatism) is affected by the local shape of the surface.

As described in the conventional examples, it is difficult to achieve correction for these aberrations by one reflecting surface. In the present invention, therefore, the first reflecting surface S1 is designed mainly to correct the telecentricity of principal rays and the distortion of image and to align the average image plane with the aforementioned plane H, while the second reflecting surface S2 is designed to correct remaining astigmatism.

The second optical acting surface S2 is shaped mainly to correct astigmatism of beam, as illustrated in FIG. 2. Specifically, local image magnifications of rays in the YZ section are increased from the near side (A) to the far side (B) with respect to the first optical acting surface S1, whereas local image magnifications of rays in the XZ section are decreased from the near side (A) to the far side (B) with respect to the first optical acting surface. A local image magnification is a ratio b"/b' of image distance b" to object distance b' of the surface of interest, as illustrated in FIG. 2.

The present invention, based on this idea, corrects the curvature of field and astigmatism by setting the first optical acting surface S1 and the second optical acting surface S2 in the optimum shape.

As illustrated in FIG. 8, let us define here the XYZ coordinate system in which the origin is at the center of the pupil S (the center of the exit pupil), the Z-axis is an axis including a line segment extending from the origin, out of the reference axis ray $L_0$ as reversely traced from the origin (the positive direction of the Z-axis is a direction from the origin toward the optical system), the Y-axis is an axis perpendicular to the Z-axis in a plane including the reference axis ray $L_0$ (the positive direction of the Y-axis is a direction including a component of a direction in which the reference axis ray $L_0$ as reversely traced from the origin is bent by the first optical acting surface), and the X-axis is an axis perpendicular to the Z-axis and the Y- axis (the positive direction of the X-axis is a direction from this side to that side on the plane of the drawing convenience sake).

In the present embodiment, the second optical acting surface S2 is of a rotationally asymmetric, aspherical shape only one symmetry plane of which is the YZ plane (the plane including the reference axis ray $L_0$) and the shape satisfies at least one of the following conditions (A) to (C).

$$1.0 \leq r2Lui/r2Lvi \leq 12.0 \quad (A)$$

where a ui axis is defined along an azimuth direction in which an absolute value of a local curvature radius is maximum among local curvature radii in all azimuth directions within a tangential plane around a normal on an arbitrary point i in the tangential plane at the point i in a ray effective range of the second optical acting surface (hereinafter referred to simply as a normal to the tangent plane on the point i), a vi axis is defined along an azimuth direction normal to the ui axis in the tangential plane, r2Lui is a local curvature radius in the direction of the ui axis at the point i, and r2Lvi is a local curvature radius in the direction of the vi axis at the point i.

(B) When an angle of the ui axis with respect to the YZ plane (the symmetry plane) is θ2i, absolute values of θ2i increase monotonically from the near side to the far side with respect to the YZ plane (i.e., absolute values increase with increase of absolute values of X-coordinates) at arbitrary points on an intersecting line between the second optical acting surface and a plane being normal to the YZ plane and including the Z-axis or being parallel to the Z-axis (i.e., a plane represented by Y=constant).

$$0° \leq θ2 \leq 35°$$

However, if there exist two or more azimuth directions in which the absolute value of local curvature radius is maximum, r2Lui/r2Lvi=1 and θ2i=0°; θ2i is positive in the clockwise direction on the right side of the symmetry plane (on this side of the plane of the drawing) and positive in the counterclockwise direction on the left side of the symmetry plane (on that side of the plane of the drawing) when the second optical acting surface is viewed from the origin side with the positive direction of the Y-axis up.

In the present embodiment, the first optical acting surface S1 is of a rotationally asymmetric, aspherical shape only one symmetry plane of which is the YZ plane (the plane including the reference axis ray $L_0$) and the shape satisfies at least one of the following conditions (D) to (F).

$$1.0 \leq r1Lui/r1Lvi \leq 2.0$$

where a ui axis is defined along an azimuth direction in which an absolute value of a local curvature radius is maximum among local curvature radii in all azimuth directions within a tangential plane around a normal to the tangential plane on an arbitrary point i in a ray effective range of the first optical acting surface, a vi axis is defined along an azimuth direction normal to the ui axis in the tangential plane, r1Lui is a local curvature radii in the direction of the ui axis at the point i, and r1Lvi is a local curvature radius in the direction of the vi axis at the point i.

(E) When an angle of the ui axis with respect to the YZ plane is θ1i, absolute values of θ1i increase monotonically from the near side to the far side with respect to the YZ plane (i.e., absolute values increase with increase of absolute values of X-coordinates) at arbitrary points on an intersecting line between the first optical acting surface and a plane being normal to the YZ plane and including the Z-axis or being parallel to the Z-axis (i.e., a plane represented by Y=constant).

$$0° \leq θ1i \leq 21° \quad (F)$$

However, if there exist two or more azimuth directions in which the absolute value of local curvature radius is maximum, r1Lui/r1Lvi=1 and θ1i 0°; θ1i is positive in the clockwise direction on the right side of the YZ plane (on this side of the plane of the drawing) and positive in the counterclockwise direction on the left side of the YZ plane (on that side of the plane of the drawing) when the first optical acting surface is viewed from the origin side with the positive direction of the Y-axis up.

Incidentally, the ray effective range of the second optical acting surface S2 is defined as follows; intersecting points are obtained of six principal rays determined by X-directional and Y-directional combination of the X-directional view angle of zero, the maximum X-directional view angle, the maximum positive Y-directional view angle, the Y-directional view angle of zero, and the maximum negative Y-directional view angle out of principal rays emitted from an arbitrary point on the display surface P and passing the center of the exist pupil S, with a surface area acting to reflect in the second optical acting surface S2, and the ray effective range of the second optical acting surface S2 is defined as the sum of a region including all the intersecting points and a mirror-symmetric region thereof with respect to the YZ plane.

The ray effective range of the first optical acting surface S1 is defined as follows; intersecting points are obtained of six principal rays determined by X-directional and Y-directional combination of the X-directional view angle of zero, the maximum X-directional view angle, the maximum positive Y-directional view angle, the Y-directional view angle of zero, and the maximum negative Y-directional view angle out of principal rays emitted from an arbitrary point on the display surface P and passing the center of the exist pupil S, with the first optical acting surface S1, and the ray effective range of the first optical acting surface S1 is defined as the sum of a region including all the intersecting points and a mirror-symmetric region thereof with respect to the YZ plane.

In the present embodiment the ray effective range of each surface is defined as described above, but without having to be limited to it, the ray effective range of each surface may also be defined as an arbitrary area set inside of a mirror surface section area of each optical acting surface while the shortest distance from the mirror surface section to the ray effective range is not less than 5 mm. This range is merely a designation of a range to which the numerical restriction of the present example is applied, and it is noted that rays may be incident or emergent, or be reflected outside this range.

It becomes possible to correct the distortion of image, curvature of field, astigmatism, and telecentricity by the two reflecting surfaces having the respective shapes as described above, and it is noted that better correction can be made for slight distortion of image and deviation of telecentricity, which vary depending upon the shape of the second optical acting surface S2, and for partial variation of the image plane, by placing a third optical acting surface S3 (not illustrated) near the display surface between the second optical acting surface S2 and the display surface P.

Since overlapping of beams reaching each point (image point) on the display surface P is decreased by providing the third optical acting surface S3 as a refracting surface near the display surface P, partial correction of image point can be made by changing the local shape of the surface. When the optical system is provided with the third optical acting surface as described above, remaining aberration without being corrected by the first reflecting surface S1 and the second reflecting surface S2 described previously can be corrected readily.

The above description was given as to the structure in which each reflecting surface was placed on air for easy understanding, but the following embodiments will be described in such a structure that a transparent optical material such as glass, plastics, or the like is used as a medium and the first optical acting surface S1, the second optical acting surface S2, and the third optical acting surface S3 as a refracting surface are formed thereon. At this time, reflection on the second optical acting surface S2 is total reflection and the light emitted from the display surface P is first transmitted by the third optical acting surface S3. Then the light travels toward the second optical acting surface S2 to be totally reflected thereby. The reflected light travels toward the first optical acting surface S1 to be reflected thereby. Then the light travels again toward the second optical acting surface and is transmitted by this surface S2, this time to reach the pupil S of the viewer.

FIGS. 3A and 3B are schematic diagrams of a major part of an embodiment of the image viewing optical system according to the present invention. In the figures, B1 represents an optical element, which has the first, second, and third optical acting surfaces S1, S2, and S3. Each of the surfaces is a rotationally asymmetric, aspherical surface which is symmetric only with respect to one symmetry plane (the YZ plane). S indicates the desired pupil position of the viewer or stop position and P the display surface of image display means such as a liquid crystal display or the like.

The shape of the third optical acting surface S3 is an aspherical surface which is symmetric only with respect to the symmetry plane and which is arranged so that the reference axis ray Lo outgoing from the center of the display surface P (or outgoing on the symmetry plane approximately normally to the display surface P) is incident approximately normally thereto. The shape of the second optical acting surface S2 is an aspherical surface which is symmetric only with respect to the symmetry plane, which is arranged as inclined relative to the reference axis ray Lo refracted by the third optical acting surface S3, and which totally reflects the reference axis ray Lo.

The first optical acting surface S1 is an aspherical reflecting surface of a generally strong concave surface (with a reflecting film on the surface) which is symmetric only with respect to the symmetry plane and which is arranged as inclined relative to the reference axis ray Lo totally reflected by the second optical acting surface S2. The reference axis ray Lo reflected by the first optical acting surface S1 is transmitted by the second optical acting surface S2 to reach the pupil S.

The optical action of the present embodiment will be described. The light emitted from an image displayed on the display surface P first passes through the third optical acting surface S3 to travel toward the second optical acting surface S2. The light is totally reflected by this surface S2 toward the first optical acting surface S1. The light is reflected by this surface S1 to become converging light. Then the light travels again toward the second optical acting surface 52 to be transmitted by the surface S2 this time. Then the light reaches the pupil S of the viewer whereupon a virtual image of the display surface P is visually recognized by the viewer.

Figure 4:
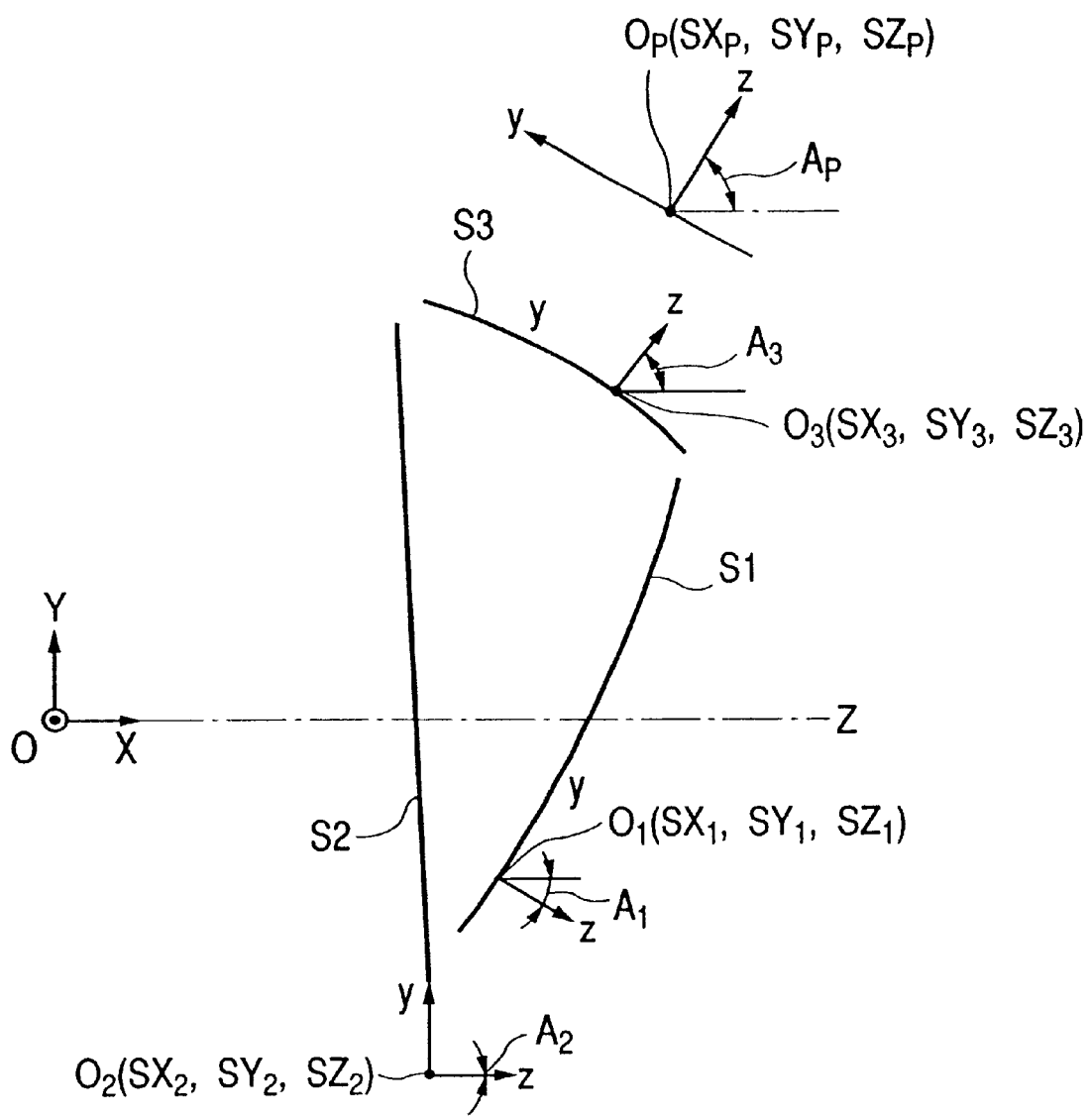
FIG. 4 is an explanatory diagram of an absolute coordinate system and local coordinate systems of the optical system in each example.

Since the first and second optical acting surfaces are decentered surfaces in the optical system of the present embodiment, the absolute coordinate system and local coordinate systems will be set in order to express the shape of the optical system. FIG. 4 is an explanatory diagram of the absolute coordinate system and local coordinate systems. This will be explained.

The absolute coordinate system is the same as the coordinate system having been explained referring to FIG. 8, but it will be explained again herein. The origin of the absolute coordinate system is set at the center O of the desired pupil position S of the viewer and the Z-axis is a straight line passing the point O normally to the pupil surface and being on the plane of the drawing. The Y-axis is a straight line passing the origin O and making the angle of 90° counterclockwise to the Z-axis on the plane of the drawing. The X-axis is a straight line passing the origin O and being perpendicular to the Y- and Z-axes. The Z-axis is superimposed on the reference axis ray Lo emerging approximately normally to the display surface P from the center of the display surface P of image display means and reaching the center of the pupil S.

The origin O of the local coordinate systems is set for each surface by absolute coordinates (SXi, SYi, SZi). The z-axis of each local coordinate system is a straight line passing the origin O in the YZ plane and making an angle Ai to the Z-axis of the absolute coordinate system. The y-axis is a straight line passing the origin Oi and making the angle of 90° counterclockwise to the z-axis. The x-axis is a straight line passing the origin Oi and being perpendicular to the y-axis and the z-axis. The shape of each surface will be expressed by the local coordinate system.

In each embodiment of the present invention the shape of the optical acting surfaces is defined by the following function having aspherical terms of the Zernike polynomials in addition to a conical function defined by a conical coefficient.

$$z = c(x^2+y^2)/[1+\{1-(1+k)c^2(x^2+y^2)\}^{1/2}]$$
$$+ c1(x^2-y^2)$$
$$+ c2(-1+2x^2+2y^2)$$
$$+ c3(-2y+3x^2y+3y^3)$$
$$+ c4(3x^2y-y^3)$$
$$+ c5(x^4-6x^2y^2+y^4)$$
$$+ c6(-3x^2+4x^4+3y^2-4y^4)$$
$$+ c7(1-6x^2+6x^4-6y^2+12x^2y^2+6y^4)$$
$$+ c8(3y-12x^2y+10x^4y-12y^3+20x^2y^2+10y^5)$$
$$+ c9(-12x^2y+15x^4y+4y^3+10x^2y^3-5y^5)$$
$$+ c10(5x^4y-10x^2y^3+y^5)$$
$$+ c11(x^6-15x^4y^2+15x^2y^4-y^6)$$
$$+ c12(6x^6-30x^4y^2-30x^2y^4+6y^6-5x^4+30x^2y^2-5y^4)$$
$$+ c13(15x^6+15x^4y^2-15x^2y^4-15y^6-20x^4+20y^4+6x^2-6y^2)$$
$$+ c14(20x+60x^4y^2+60x^2y^4+20y^6-30x^4-60x^2y^2-30y^4+12x^2+12y^2-1)$$

In the above function, c is curvature defined by $c=1/r$, where r is a basic curvature radius of each surface.

Further, k is the conical coefficient of each surface and $cj$ is an aspherical coefficient of the jth Zernike polynomial in each surface.

Table 1 shows constitutional data of the optical system in Example 1. In the table, f is a value corresponding to the focal length of the optical element B1, which is calculated according to the following relation from the incident angle e of the incident light from an object at infinity and an image height ym of an image formed on the display surface P by the light.

$$f = ym/\tan(\theta)$$

It will be called simply the focal length herein.

Figure 5A:
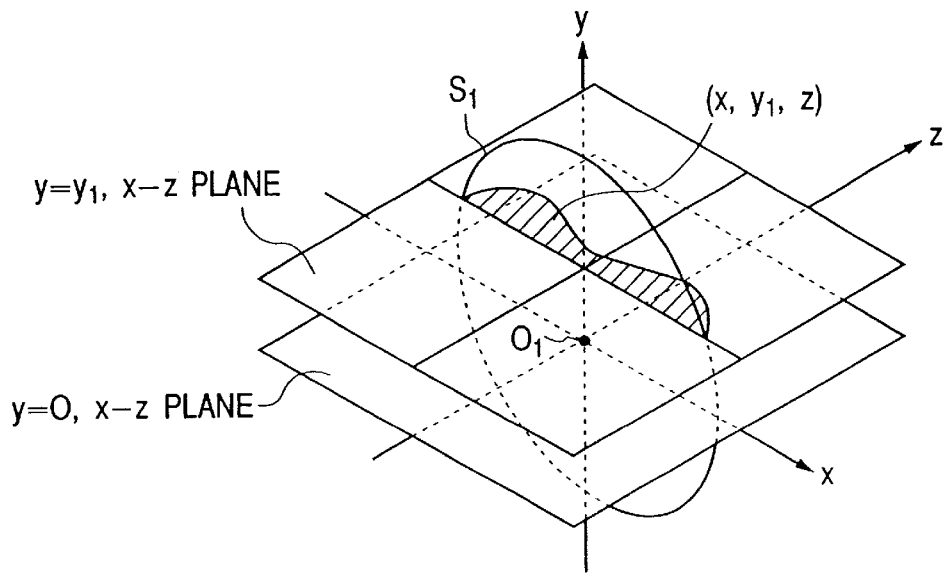
FIGS. 5A and 5B are explanatory diagrams of local curvature radii rLx, rLy.
Figure 5B:
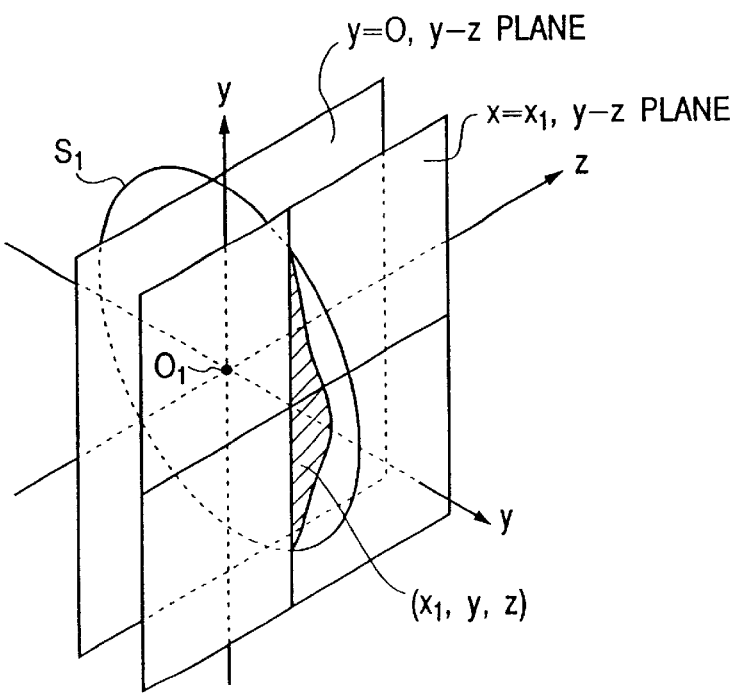

Here, local curvature radii rLx and rLy will be described in more detail. FIGS. 5A and 5B are explanatory diagrams for explaining the local curvature radii rLx and rLy.

The local curvature radii rLx are local curvature radii on an intersecting line between the surface Si and a plane parallel to the XZ plane (y=yT apart therefrom in the figure), as illustrated in FIG. 5A.

Further, the local curvature radii rLy are local curvature radii on an intersecting line between the surface S1 and a plane parallel to the YZ plane (x=xT apart therefrom in the figure), as illustrated in FIG. 5B. However, signs of the local curvature radii rLx, rLy of each surface are based on the local coordinate system of each surface determined from the constitutional data of example with respect to the absolute coordinate system on the origin of the visual axis (the Z-axis). Specifically, the local curvature radius takes a negative value when curvature is concave relative to the z-axis of the local coordinate system.

Let us suppose radii of curvature in all azimuth sections where the local curvature radii rLx, rLy are rotated about the normal to the tangent plane. Then a u-axis is taken along an azimuth direction in which an absolute value of a radius of curvature is maximum, a v-axis is taken along an axis perpendicular to the u-axis, and rLu, rLv represent local curvature radii in the u-axis direction and in the v-axis direction, respectively. Table 2 shows rLu, rLv of the first and second optical acting surfaces at six points in the acting surfaces. Coordinates in the table are local coordinates of the surfaces.

Particularly, in cases where a material having the refractive index of about 1.54 to 1.6 is used as a material for the optical element as in the present embodiment, it is further desirable that the shape of the second optical acting surface be one satisfying the following conditions.

$$2.7 \leq r2Lui/r2Lvi \leq 6.0 \tag{a1}$$

$$0° \leq \theta_{2i} \leq 26° \tag{c1}$$

It is further desirable that the shape of the first optical acting surface be one satisfying the following conditions.

$$1.2 \leq r1Lui/r1Lvi \leq 1.55 \tag{d1}$$

$$0° \leq \theta_{1i} \leq 13° \tag{f1}$$

Figure 6:
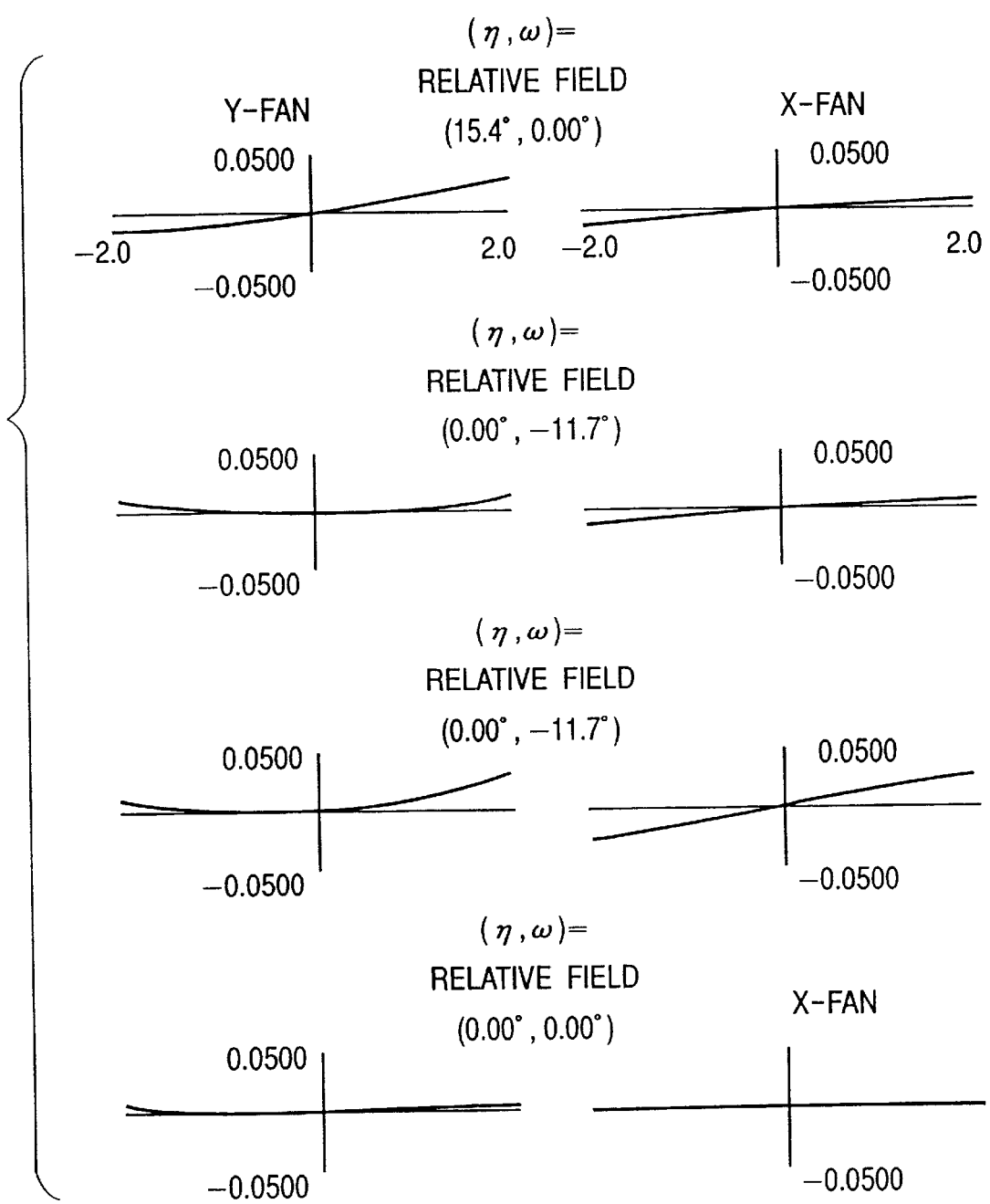
FIG. 6 shows aberration diagrams of the optical system in Example 1.

FIG. 6 shows aberration diagrams of the optical system in Example 1. The aberration diagrams show the lateral aberration at an image point on the reference axis ray Lo, at image points of ±ω in the y-direction with respect to the reference axis ray Lo, and at an image point of ±η in the x-direction with respect to the reference axis ray Lo.

Figure 7:
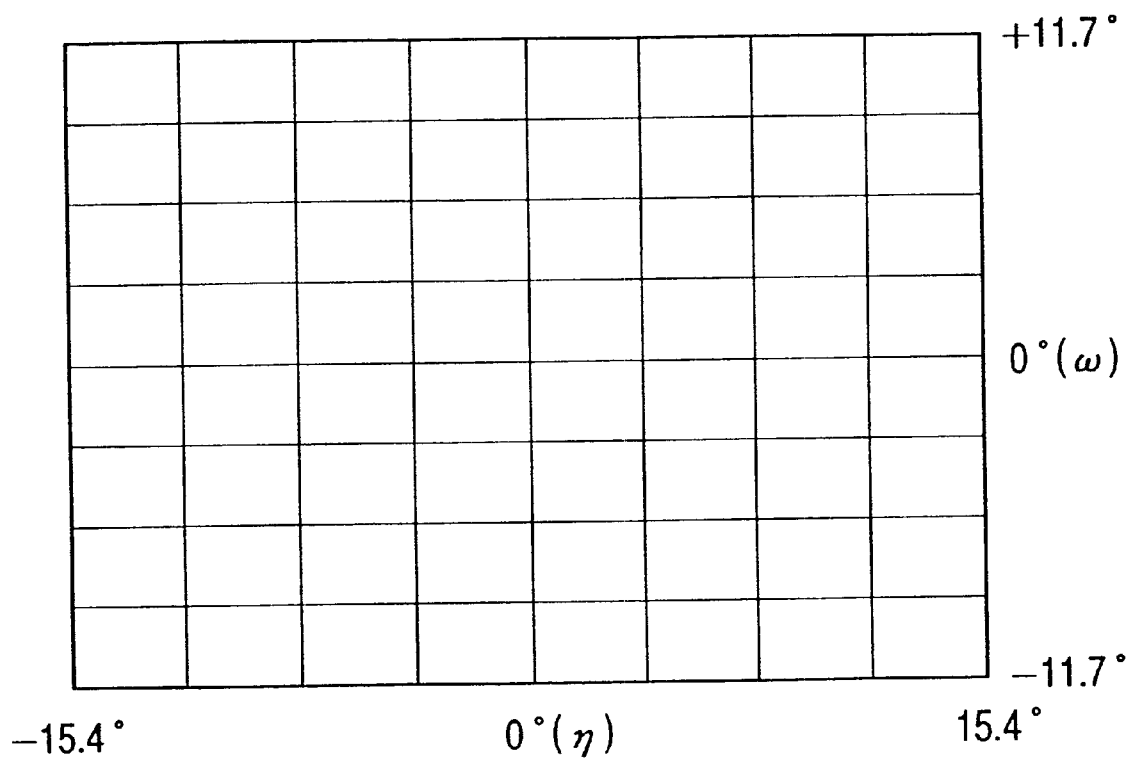
FIG. 7 is a diagram to show deformation of image of the optical system in Example 1.

FIG. 7 shows a checkerboard pattern of distortion of image where ray tracing is carried out from the pupil S to the display surface P. Supposing the distortion of image on the display surface P is pincushion distortion, ray tracing from the display surface P to the pupil S in the optical system will result in distortion of image of the barrel form opposite thereto.

Table 3 shows the constitutional data of the optical system in Example 2. Table 4 shows the local curvature radii rLu, rLv of the first and second optical acting surfaces at six points in the acting surfaces in this Example 2.

The present embodiment is an example in which a material having a smaller refractive index (the refractive index of 1.50 to 1.54) than that in Example 1 is used as a material for the optical element.

In the present example, the same effect as in Example 1 can also be acheived by determining the surface shapes of the first and second optical acting surfaces under the same conditions as in Example 1, and, particularly in cases where the material for the optical element is one having the smaller refractive index than in Example 1, as in the present embodiment, it is further desirable that the shape of the second optical acting surface be one satisfying the following conditions.

$$1.8 \leq r2Lui/r2Lvi \leq 3.7 \tag{a2}$$

$$0° \leq \theta_{2i} \leq 26° \tag{c2}$$

Moreover, it is further desirable that the shape of the first optical acting surface be one satisfying the following conditions.

$$1.0 \leq r1Lui/r1Lvi \leq 1.5 \tag{d2}$$

$$0° \leq \theta_{1i} \leq 8° \tag{f2}$$

Table 5 shows the constitutional data of the optical system in Example 3. Table 6 shows the local curvature radii rLui, rLvi of the first and second optical acting surfaces of the present example at six points in the acting surfaces.

The present embodiment is an example in which a material having a still smaller refractive index (the refractive index of 1.46 to 1.5) than that in Example 2 is used as a material for the optical element.

In the present embodiment the same effect as in Example 1 is also achieved by determining the surface shapes of the first and second optical acting surfaces under the same conditions as in Example 1, and, particularly in cases where the material of the optical element is one having the smaller refractive index, as in the present embodiment, it is further desirable that the shape of the second optical acting surface be one satisfying the following conditions.

$$1.3 \leq r2Lui/r2Lvi \leq 5.2 \tag{a3}$$

$$0° \leq \theta_{2i} \leq 35° \tag{c3}$$

Moreover, it is further desirable that the shape of the first optical acting surface be one satisfying the following conditions.

$$1.1 \leq r1Lui/r1Lvi \leq 1.4 \tag{d3}$$

$$0° \leq \theta_{1i} \leq 10° \tag{f3}$$

Table 7 shows the constitutional data of the optical system in Example 4. Table 8 shows the local curvature radii rLu, rLv of the first and second optical acting surfaces of the present example at six points in the acting surfaces.

The present example is an example designed so that the viewer can view the image from a more distant position from the optical element than in Example 1.

In the present embodiment the same effect as in Example 1 is also achieved by determining the surface shapes of the first and second optical acting surfaces under the same conditions as in Example 1, and, particularly, it is further desirable that the shape of the second optical acting surface be one satisfying the following conditions.

$$4.5 \leq r2Lui/r2Lvi \leq 12 \tag{a4}$$

$$0° \leq \theta_{2i} \leq 25° \tag{c4}$$

Moreover, it is further desirable that the shape of the first optical acting surface be one satisfying the following conditions.

$$1.3 \leq r1Lui/r1Lvi \leq 1.6 \tag{d4}$$

$$0° \leq \theta_{1i} \leq 13° \tag{f4}$$

Table 9 shows the constitutional data of the optical system in Example 5. Table 10 shows the local curvature radii rLu, rLv of the first and second optical acting surfaces of the present example at six points in the acting surfaces.

The present embodiment is an example designed so that the viewer can view an image with a wider angle of view than in Example 1.

In the present example the same effect is also achieved by determining the surface shapes of the first and second optical acting surfaces under the same conditions as in Example 1, and, particularly, it is further desirable that the shape of the second optical acting surface be one satisfying the following conditions.

$$3 \leq r2Lui/r2Lvi \leq 6.3 \tag{a5}$$

$$0° \leq \theta_{2i} \leq 27° \tag{d5}$$

Moreover, it is further desirable that the shape of the first optical acting surface be one satisfying the following conditions.

$$1.2 < r1Lui/r1Lvi \leq 1.6 \tag{d5}$$

$$0° \leq \theta_{1i} \leq 21° \tag{f5}$$

Figure 3:
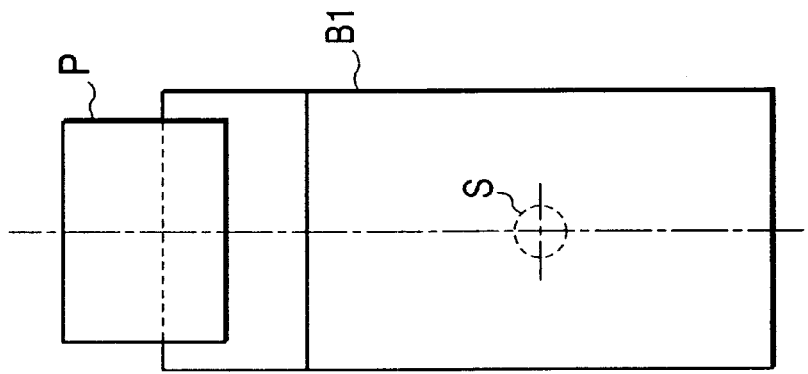
FIGS. 3A and 3B are schematic diagrams of a major part of an embodiment of the image viewing optical system.

In each of the above embodiments, for example, the optical system can also be used as an image pickup system by placing an image pickup device on the display surface P of the image display means and using the stop S as an entrance pupil in FIG. 3, which can accomplish an image pickup optical system capable of obtaining a good image.

TABLE 1 f = 22.74    N = −1.57

| Surface | S1 | S2 | S3 | P |
|---|---|---|---|---|
| 1/r | −1.435E − 02 | −2.473E − 03 | −8.947E − 03 | |
| k | 0 | 0 | 0 | |
| c1 | −0.001361 | −0.000534 | 0.0.26966 | |
| c2 | −0.00077 | −0.000366 | −0.005397 | |
| c3 | −3.21E − 07 | −2.00E − 07 | 1.70E − 04 | |
| c4 | −7.07E − 06 | −2.63E − 06 | −3.20E − 04 | |
| c5 | −9.09E − 08 | 3.75E − 08 | −6.34E − 06 | |
| c6 | −1.11E − 08 | −1.14E − 09 | −7.65 − 05 | |
| c7 | −1.03E − 07 | −6.96E − 10 | 1.48E − 06 | |
| c8 | −356E − 09 | −9.48E − 12 | −1.19E − 07 | |
| c9 | 3.57E − 09 | −7.53E − 12 | 8.04E − 08 | |
| c10 | −1.66E − 09 | 3.28E − 10 | 5.89E − 09 | |
| c11 | −3.91E − 11 | −2.93E − 12 | | |
| c12 | 1.12E − 10 | −5.19E − 13 | | |
| c13 | −7.93E − 11 | 1.71E − 3 | | |
| c14 | 7.45E − 11 | −2.43E − 13 | | |
| SX(mm) | 0 | 0 | 0 | 0 |
| SY(mm) | −4.34 | −59.64 | 14.67 | 23.32 |
| SZ(mm) | 42.17 | 34.9 | 49.88 | 45.52 |
| A(deg) | −26.3587 | −4.1592 | 56.4413 | 48.8971 |

TABLE 2

| S1 | | | | |
|---|---|---|---|---|
| x (mm) | rLu/rLv | | θ (°) | |
| y(mm) | 0 | 10.931 | 0 | 10.931 |
| 13.047 | 1.408 | 1.365 | 0.002 | 3.553 |
| 4.402 | 1.379 | 1.361 | 0.001 | 4.803 |
| −3.979 | 1.345 | 1.347 | 0.001 | 4.325 |

TABLE 2-continued

| S1 | | | | |
|---|---|---|---|---|
| x (mm) | | rLu/rLv | | θ (°) |
| y(mm) | 0 | 9.234 | 0 | 9.234 |
| 66.176 | 4.109 | 4.67 | 0.029 | 15.195 |
| 59.453 | 4.501 | 4.994 | 0.024 | 14.327 |
| 52.531 | 4.547 | 4.87 | 0.019 | 13.386 |

| S1 | | | | |
|---|---|---|---|---|
| x (mm) | | rLu/rLv | | θ (°) |
| y(mm) | 0 | 8.212 | 0 | 9.234 |
| 77.209 | 3.21 | 3.592 | 0.037 | 4.67 |
| 68.444 | 3.894 | 4.391 | 0.031 | 4.994 |
| 58.066 | 4.527 | 4.959 | 0.023 | 4.87 |

TABLE 3 f = 23.78   N = 1.53

| Surface | S1 | S2 | S3 | P |
|---|---|---|---|---|
| 1/r | −1.457E − 02 | −2.336E − 03 | −1.995E − 02 | |
| k | 0 | 0 | 0 | |
| c1 | −0.000983958 | −0.000684304 | 0.015650746 | |
| c2 | −0.000672207 | −0.000334229 | −0.006512754 | |
| c3 | −6.42E − 07 | −7.63E − 07 | 4.38E − 04 | |
| c4 | −4.23E − 06 | −2.88E − 06 | −0.000496337 | |
| c5 | −6.06E − 08 | 3.19E − 08 | −1.17E − 05 | |
| c6 | −3.13E − 08 | 3.53E − 09 | −2.02E − 06 | |
| c7 | −8.21E − 08 | −2.50E − 09 | 5.23E − 07 | |
| c8 | −1.87E − 08 | −1.30E − 11 | −1.46E − 07 | |
| c9 | 2.07E − 09 | −1.81E − 11 | −4.53E − 09 | |
| c10 | 1.10E − 09 | 5.11E − 10 | −1.15E − 07 | |
| c11 | −5.75E − 12 | 8.12E − 13 | | |
| c12 | 1.05E − 10 | −4.16E − 13 | | |
| c13 | −2.24E − 11 | 1.05E − 13 | | |
| c14 | 6.46E − 11 | −2.33E − 13 | | |
| SX(mm) | 0 | 0 | 0 | 0 |
| SY(mm) | −58.57 | −4.63 | 15.03 | 24.4 |
| SZ(mm) | 34.02 | 42.51 | 49.32 | 46.06 |
| A(deg) | −4.5321 | −25.7866 | 51.7907 | 47.3778 |

TABLE 4

| S1 | | | | |
|---|---|---|---|---|
| x (mm) | | rLu/rLv | | θ (°) |
| y(mm) | 0 | 12.229 | 0 | 12.229 |
| 14.147 | 1.37 | 1.23 | 0.002 | 5.833 |
| 4.563 | 1.262 | 1.203 | 0.001 | 4.634 |
| −4.671 | 1.243 | 1.232 | 0.001 | 3.847 |

| S1 | | | | |
|---|---|---|---|---|
| x (mm) | | rLu/rLv | | θ (°) |
| y(mm) | 0 | 10.307 | 0 | 10.307 |
| 65.819 | 2.449 | 2.716 | 0.028 | 10.307 |
| 58.415 | 2.859 | 3.142 | 0.022 | 14.991 |
| 50.79 | 3.175 | 3.424 | 0.018 | 13.915 |

TABLE 4-continued

| S1 | | | | |
|---|---|---|---|---|
| x (mm) | | rLu/rLv | | θ (°) |
| y(mm) | 0 | 9.457 | 0 | 9.457 |
| 76.981 | 1.848 | 2.038 | 0.039 | 16.879 |
| 67.422 | 2.325 | 2.587 | 0.03 | 15.489 |
| 56.027 | 2.942 | 3.233 | 0.021 | 14.135 |

TABLE 5 f = 23.33   N = 1.491

| Surface | S1 | S2 | S3 | P |
|---|---|---|---|---|
| 1/r | −0.0143919 | −1.77E − 03 | −0.021465 | |
| k | 0 | 0 | 0 | |
| c1 | −0.001224063 | −0.001641428 | 0.013480754 | |
| c2 | −0.000688104 | −0.000308711 | −0.006594722 | |
| c3 | −4.92E − 06 | −1.13E − 05 | 0.00043944 | |
| c4 | −8.77E − 07 | 1.12E − 05 | −0.000735784 | |
| c5 | −6.52E − 08 | 1.02E − 07 | −2.35E − 05 | |
| c6 | 4.27E − 08 | 6.33E − 08 | 2.97E − 06 | |
| c7 | −9.88E − 08 | 3.45E − 08 | −3.68E − 07 | |
| c8 | 5.41E − 11 | 7.90E − 10 | −1.12E − 07 | |
| c9 | 9.14E − 11 | −7.10E − 11 | −8.24E − 08 | |
| c10 | 2.02E − 09 | 1.52E − 09 | 4.70E − 08 | |
| c11 | 5.06E − 11 | 8.22E − 12 | | |
| c12 | 1.11E − 10 | −1.42E − 13 | | |
| c13 | 1.71E − 11 | 5.47E − 14 | | |
| c14 | 7.59E − 11 | −3.48E − 12 | | |
| SX(mm) | 0 | 0 | 0 | 0 |
| SY(mm) | −59.22 | −4.56 | 14.15 | 23.99 |
| SZ(mm) | 34.54 | 41.88 | 49.24 | 45.62 |
| A(deg) | −4.8931 | −25.7038 | 51.6763 | 48.4648 |

TABLE 6

| S1 | | | | |
|---|---|---|---|---|
| x (mm) | | rLu/rLv | | θ (°) |
| y(mm) | 0 | 10.735 | 0 | 10.735 |
| 13.14 | 1.314 | 1.209 | 0.002 | 3.961 |
| 4.663 | 1.291 | 1.224 | 0.001 | 5.804 |
| −3.542 | 1.342 | 1.295 | 0 | 3.468 |

| S1 | | | | |
|---|---|---|---|---|
| x (mm) | | rLu/rLv | | θ (°) |
| y(mm) | 0 | 9.108 | 0 | 9.108 |
| 65.583 | 3.258 | 3.628 | 0.029 | 15.415 |
| 59.016 | 4.863 | 5.058 | 0.02 | 12.835 |
| 52.241 | 4.689 | 4.571 | 0.015 | 11.542 |

| S1 | | | | |
|---|---|---|---|---|
| x (mm) | | rLu/rLv | | θ (°) |
| y(mm) | 0 | 8.398 | 0 | 8.398 |
| 76.369 | 1.395 | 1.723 | 0.084 | 25.671 |
| 67.708 | 2.636 | 3.078 | 0.034 | 15.792 |
| 57.344 | 5.007 | 5.153 | 0.019 | 11.978 |

TABLE 7

| | f = 22.84 | N = 1.57 | | |
|---|---|---|---|---|
| Surface | S1 | S2 | S3 | P |
| 1/r | −0.014407 | −2.40E − 03 | −0.0210669 | |
| k | 0 | 0 | 0 | |
| c1 | −0.001603486 | −0.000562254 | 0.01597653 | |
| c2 | −0.000727438 | −0.000345753 | −0.005278177 | |
| c3 | −2.51E − 06 | −2.89E − 07 | 0.000161065 | |
| c4 | −8.83E − 05 | −2.43E − 06 | −0.000221552 | |
| c5 | −1.73E − 07 | 3.59E − 08 | 1.83E − 06 | |
| c6 | 2.21E − 08 | 4.49E − 10 | −1.35E − 05 | |
| c7 | −1.24E −07 | −2.07E − 09 | 6.15E − 06 | |
| c8 | −1.43E − 09 | −1.81E − 01 | −2.56E − 07 | |
| c9 | 1.10E − 09 | −3.46E − 12 | 1.47E − 07 | |
| c10 | −2.53E − 10 | 4.18E − 10 | 1.75E − 07 | |
| c11 | −4.55E − 11 | −2.93E − 12 | | |
| c12 | 1.00E − 10 | −2.49E − 13 | | |
| c13 | −5.62E − 11 | 6.85E − 14 | | |
| c14 | 5.54E − 11 | −2.51E − 13 | | |
| SX(mm) | 0 | 0 | 0 | 0 |
| SY(mm) | −58.79 | −3.03 | 15.44 | 24.12 |
| SZ(mm) | 36.07 | 45.57 | 52.58 | 49.05 |
| A(deg) | −5.8602 | −26.5545 | 49.2114 | 45.3782 |

TABLE 8

S1

| y(mm) | x (mm) | rLu/rLv | | θ (°) | |
|---|---|---|---|---|---|
| | 0 | 11.701 | 0 | 11.701 | |
| | 12.156 | 1.466 | 1.422 | 0.002 | 7.227 |
| | 2.763 | 1.459 | 1.455 | 0.001 | 6.723 |
| | −6.265 | 1.397 | 1.415 | 0.001 | 6.879 |

S1

| y(mm) | x (mm) | rLu/rLv | | θ (°) | |
|---|---|---|---|---|---|
| | 0 | 10.055 | 0 | 10.055 | |
| | 65.99 | 6.001 | 7.655 | 0.029 | 16.49 |
| | 58.63 | 5.694 | 6.843 | 0.024 | 15.993 |
| | 51.15 | 4.985 | 5.587 | 0.02 | 15.269 |

S1

| y(mm) | x (mm) | rLu/rLv | | θ (°) | |
|---|---|---|---|---|---|
| | 0 | 8.631 | 0 | 8.631 | |
| | 77.62 | 5.575 | 6.688 | 0.035 | 13.892 |
| | 68.132 | 5.992 | 7.254 | 0.03 | 14.52 |
| | 56.394 | 5.59 | 6.356 | 0.024 | 14.834 |

TABLE 9

| | f = 20.29 | N = 1.57 | | |
|---|---|---|---|---|
| Surface | S1 | S2 | S3 | P |
| 1/r | −0.015493378 | −2.47E − 03 | −0.0148976 | |
| k | 0 | 0 | 0 | |
| c1 | −0.001461641 | −0.000528496 | 0.016650742 | |
| c2 | −0.001047456 | −0.000361066 | −0.007518291 | |
| c3 | 4.52E − 07 | −3.88E − 07 | 0.000135305 | |
| c4 | −1.30E − 05 | −2.09E − 06 | −6.86E − 06 | |
| c5 | −2.25E − 07 | 3.27E − 08 | 1.30E − 06 | |
| c6 | 1.56E − 09 | 1.11E − 09 | −1.64E − 05 | |
| c7 | −1.97E − 07 | −2.53E − 09 | 6.29E − 06 | |
| c8 | −2.88E − 09 | −2.00E − 11 | −2.62E − 07 | |
| c9 | 1.88E − 09 | 7.34E − 13 | 1.05E − 07 | |

TABLE 9-continued

| | f = 20.29 | N = 1.57 | | |
|---|---|---|---|---|
| Surface | S1 | S2 | S3 | P |
| c10 | −3.39E − 09 | 3.93E − 10 | −1.51E − 07 | |
| c11 | −8.79E − 11 | −4.01E − 12 | | |
| c12 | 1.42E − 10 | −2.45E − 13 | | |
| c13 | −5.37E − 11 | 1.48E − 13 | | |
| c14 | 6.85E − 11 | −2.50E − 13 | | |
| SX(mm) | 0 | 0 | 0 | 0 |
| SY(mm) | −59.61 | −3.35 | 14.07 | 22.04 |
| SZ(mm) | 35.12 | 41.27 | 48.59 | 43.66 |
| A(deg) | −4.5889 | −25.6652 | 51.1689 | 50.4892 |

TABLE 10

S1

| y(mm) | x (mm) | rLu/rLv | | θ (°) | |
|---|---|---|---|---|---|
| | 0 | 11.931 | 0 | 11.931 | |
| | 12.549 | 1.38 | 1.349 | 0.003 | 9.486 |
| | 3.134 | 1.373 | 1.382 | 0.001 | 8.637 |
| | −6.051 | 1.27 | 1.282 | 0.002 | 9.871 |

S1

| y(mm) | x (mm) | rLu/rLv | | θ (°) | |
|---|---|---|---|---|---|
| | 0 | 10.425 | 0 | 10.425 | |
| | 66.831 | 3.894 | 4.895 | 0.034 | 19.436 |
| | 59.371 | 3.762 | 4.555 | 0.029 | 19.178 |
| | 51.591 | 3.463 | 3.951 | 0.024 | 18.488 |

S1

| y(mm) | x (mm) | rLu/rLv | | θ (°) | |
|---|---|---|---|---|---|
| | 0 | 8.931 | 0 | 8.931 | |
| | 76.623 | 3.836 | 4.468 | 0.039 | 15.834 |
| | 67.164 | 3.9 | 4.642 | 0.034 | 17.217 |
| | 54.629 | 3.644 | 4.153 | 0.027 | 18.095 |

The setting of each element of the optical system as described above permits accomplishment of the image viewing optical system that is well corrected for the various aberrations and has the wide angle of view even in the extremely simple structure and that, when used as a viewing system, permits the viewer to view the information of the image displayed on the display surface of image display means in good order.

Further, the image viewing optical system and image pickup optical system can also be accomplished utilizing the optical system that is well corrected for the various aberrations and has the wide angle of view even in the extremely simple structure and that, when used as a viewing system, satisfies the telecentric condition that the principal rays are emergent approximately normally from the display surface of the image display means.

What is claimed is:

1. An optical system comprising the following in an optical path between a focal plane and a stop;
    a first optical acting surface; and
    a second optical acting surface,
        wherein, in an optical path traced from the focal plane to the stop, light emitted from the focal plane is reflected by said second optical acting surface and thereafter reflected by said first optical acting surface to reach the stop, and wherein a ray connecting a center of the focal plane with a center of the stop via said first optical acting surface and said second optical acting surface is defined as a reference axis ray, the center of the stop is defined as an origin, an axis including a line segment extending from the origin, out of the reference axis ray traced from the origin to the center of the focal plane, is defined as a Z-axis (a positive direction of which is a direction extending from the origin to said optical system), and an axis perpendicular to the Z-axis in a plane including the reference axis ray is defined as a Y-axis (a positive direction of which is a direction including a component of a direction in which the reference axis ray traced from the origin to the center of the focal plane is bent by said first optical acting surface), wherein said second optical acting surface is of a rotationally asymmetric, aspherical shape only one symmetry plane of which is a plane including the reference axis ray, and satisfies the following conditions (A), (B), and (C):

$$1.0 \leq r2Lui/r2Lvi \leq 12.0 \quad (A)$$

where an azimuth direction in which an absolute value of a local curvature radius is maximum, out of local curvature radii in all azimuth directions in a tangent plane around a normal to the tangent plane on an arbitrary point i in a ray effective range of said second optical acting surface, is defined as a ui axis, an azimuth direction normal to the ui axis is defined as a vi axis, a local curvature radius in the direction of the ui axis at the arbitrary point i is defined as r2Lui, and a local curvature radius in the direction of the vi axis is defined as r2Lvi;

(B) when an angle of the ui axis with respect to the symmetry plane is θ2i, absolute values of the θ2i increase monotonically from the near side to the far side with respect to the symmetry plane at arbitrary points on an intersecting line between the second optical acting surface and a plane normal to the symmetry plane and including the Z-axis or parallel with the Z-axis;

(C) said θ2i satisfies the following relation:

$$0° < \theta 2 < 35°$$

provided that r2Lui/r2Lvi=1 and θ2i=0° if there exist two or more azimuth directions in which the absolute value of the local curvature radius is maximum and that the θ2i is positive in a clockwise direction on the right side of the symmetry plane while being positive in a counterclockwise direction on the left side of the symmetry plane where said second optical acting surface is viewed from the origin side with the positive direction of the Y-axis up, and wherein said first optical acting surface is of a rotationally asymmetric, aspherical shape only one symmetry plane of which is a plane including the reference axis ray, and satisfies the following conditions (D), (E), and (F):

$$1.0 \leq r1Lui/r1Lvi \leq 2.0 \quad (D)$$

where an azimuth direction in which an absolute value of a local curvature radius is maximum, out of local curvature radii in all azimuth directions in a tangent plane around a normal to the tangent plane on an arbitrary point i in a ray effective range of said first optical acting surface, is defined as a ui axis, an azimuth direction normal to the ui axis is defined as a vi axis, a local curvature radius in the direction of the ui axis at the arbitrary point i is defined as r1Lui, and a local curvature radius in the direction of said vi axis is defined as r1Lvi;

(E) when an angle of the ui axis with respect to the symmetry plane is θ1i, absolute values of the θ1i increase monotonically from the near side to the far side with respect to the symmetry plane at arbitrary points on an intersecting line between said first optical acting surface and a plane normal to the symmetry plane and including the Z- axis or parallel with the Z-axis;

(F) the θ1i satisfies the following relation:

$$0° < \theta 1 i < 21°$$

provided that r1Lui/r1Lvi=1 and θ1i=0° if there exist two or more azimuth directions in which the absolute value of the local curvature radius is maximum and that the θ1i is positive in a clockwise direction on the right side of the symmetry plane while being positive in a counterclockwise direction on the left side of the symmetry plane where said first optical acting surface is viewed from the origin side with the positive direction of the Y-axis up.

2. An optical system comprising the following in an optical path between a focal plane and a stop:

a first optical acting surface; and a second optical acting surface, wherein, in an optical path traced from the focal plane to the stop, light emitted from the focal plane is reflected by said second optical acting surface and thereafter reflected by said first optical acting surface to reach the stop, and wherein a ray connecting a center of the focal plane with a center of the stop via said first optical acting surface and said second optical acting surface is defined as a reference axis ray, the center of the stop is defined as an origin, an axis including a line segment extending from the origin, out of the reference axis ray traced from the origin to the center of the focal plane, is defined as a Z-axis (a positive direction of which is a direction extending from the origin to said optical system), and an axis perpendicular to the Z-axis in a plane including the reference axis ray is defined as a Y-axis (a positive direction of which is a direction including a component of a direction in which the reference axis ray traced from the origin to the center of the focal plane is bent by said first optical acting surface), wherein said first optical acting surface is of a rotationally asymmetric, aspherical shape only one symmetry plane of which is a plane including the reference axis ray, and satisfies the following conditions (D), (E), and (F):

$$1.0 < r1Lui/r1Lvi \leq 2.0 \quad (D)$$

where an azimuth direction in which an absolute value of a local curvature radius is maximum, out of local curvature radii in all azimuth directions in a tangent plane around a normal to the tangent plane on an arbitrary point i in a ray effective range of said first optical acting surface, is defined as a ui axis, an azimuth direction normal to the ui axis is defined as a vi axis, a local curvature radius in the direction of the ui axis at the arbitrary point i is defined as r1Lui, and a local curvature radius in the direction of the vi axis is defined as r1aLvi;

(E) when an angle of the ui axis with respect to the symmetry plane is θ1i, absolute values of the θ1i increase monotonically from the near side to the far side with respect to the symmetry plane at arbitrary points on an intersecting line between said first optical acting surface and a plane normal to the symmetry plane and including the Z-axis or parallel with the Z-axis;

(F) the θ1i satisfies the following relation:

$$0° < θ1i ≤ 21°$$

provided that r1Lui/r1Lvi=1 and θ1i=0° if there exist two or more azimuth directions in which the absolute value of the local curvature radius is maximum and that the θ1i is positive in a clockwise direction on the right side of the symmetry plane while being positive in a counterclockwise direction on the left side of the symmetry plane where said first optical acting surface is viewed from the origin side with the positive direction of the Y-axis up.

3. An optical device comprising:
the optical system of claim 1 or 2.

4. An optical system for permitting a viewer to view an enlarged image of an original picture, said optical system comprising:
a first optical acting surface; and
a second optical acting surface,
wherein light emitted from the original picture is reflected by said second optical acting surface and thereafter reflected by said first optical acting surface, thereby being guided to the eye of the viewer, and
wherein a ray emitted from a center of the original picture and passing a center of an exit pupil of said viewing optical system via said second optical acting surface and said first optical acting surface is defined as a reference axis ray, the center of the exit pupil is defined as an origin, an axis including a line segment extending from the origin, out of the reference axis ray reversely traced from the origin, is defined as a Z-axis (a positive direction of which is a direction extending from the origin to said viewing optical system), and an axis perpendicular to the Z-axis in a plane including the reference axis ray is defined as a Y-axis (a positive direction of which is a direction including a component of a direction in which the reference axis ray reversely traced from the origin is bent by said first optical acting surface),
wherein said second optical acting surface is of a rotationally asymmetric, aspherical shape only one symmetry plane of which is a plane including the reference axis ray, and satisfies the following conditions (A), (B), and (C);

$$1.0 ≤ r2Lui/r2Lvi ≤ 12.0 \qquad A)$$

(A) where an azimuth direction in which an absolute value of a local curvature radius is maximum, out of local curvature radii in all azimuth directions in a tangent plane around a normal to the tangent plane on an arbitrary point i in a ray effective range of said second optical acting surface, is defined as a ui axis, an azimuth direction normal to the ui axis is defined as a vi axis, a local curvature radius in the direction of the ui axis at the arbitrary point i is defined as r2Lui, and a local curvature radius in the direction of the vi axis is defined as r2Lvi;

(B) when an angle of the ui axis with respect to the symmetry plane is θ2i, absolute values of the θ2i increase monotonically from the near side to the far side with respect to the symmetry plane at arbitrary points on an intersecting line between said second optical acting surface and a plane normal to the symmetry plane and including the Z-axis or parallel with the Z-axis;

(C) the θ2i satisfies the following relation:

$$0° ≤ θ_{2i} ≤ 35°$$

provided that r2Lui/r2Lvi=1 and θ2i=0° if there exist two or more azimuth directions in which the absolute value of the local curvature radius is maximum and that the θ2i is positive in a clockwise direction on the right side of the symmetry plane while being positive in a counterclockwise direction on the left side of the symmetry plane where said second optical acting surface is viewed from the origin side with the positive direction of the Y-axis up, and wherein said first optical acting surface is of a rotationally asymmetric, aspherical shape only one symmetry plane of which is a plane including the reference axis ray, and satisfies the following conditions (D), (E), and (F):

$$1.0 ≤ r1Lui/r1Lvi ≤ 2.0 \qquad D$$

(D) where an azimuth direction in which an absolute value of a local curvature radius is maximum, out of local curvature radii in all azimuth directions in a tangent plane around a normal to the tangent plane on an arbitrary point i in a ray effective range of said first optical acting surface, is defined as a ui axis, an azimuth direction normal to the ui axis is defined as a vi axis, a local curvature radius in the direction of the ui axis at the arbitrary point i is defined as r1Lui, and a local curvature radius in the direction of said vi axis is defined as r1Lvi;

(E) when an angle of the ui axis with respect to the symmetry plane is θ1i, absolute values of the θ1i increase monotonically from the near side to the far side with respect to the symmetry plane at arbitrary points on an intersecting line between said first optical acting surface and a plane normal to the symmetry plane and including the Z-axis or parallel with the Z-axis;

(F) the θ1i satisfies the following relation:

$$0° < θ1i < 21°$$

provided that r1Lui/r1Lvi=1 and θ1i=0° if there exist two or more azimuth directions in which the absolute value of the local curvature radius is maximum and that the θ1i is positive in a clockwise direction on the right side of the symmetry plane while being positive in a counterclockwise direction on the left side of the symmetry plane where said first optical acting surface is viewed from the origin side with the positive direction of the Y-axis up.

5. The optical system according to claim 4, further comprising:
an optical element comprised of a transparent, optical material having said first optical acting surface, said second optical acting surface, and a third optical acting surface, wherein the light from the original picture is incident through said third optical acting surface into said optical element, then is reflected successively by said second optical acting surface and by said first optical acting surface, and thereafter is emergent out of said second optical acting surface.

6. An optical system for permitting a viewer to view an enlarged image of an original picture, said optical system comprising:

a first optical acting surface; and a second optical acting surface, wherein light emitted from the original picture is reflected by said second optical acting surface and thereafter reflected by said first optical acting surface, thereby being guided to the eye of the viewer, and wherein a ray emitted from a center of the original picture and passing a center of an exit pupil of said viewing optical system via said second optical acting surface and said first optical acting surface is defined as a reference axis ray, the center of the exit pupil is defined as an origin, an axis including a line segment extending from the origin, out of the reference axis ray reversely traced from the origin, is defined as a Z-axis (a positive direction of which is a direction extending from the origin to said viewing optical system), and an axis perpendicular to the Z-axis in a plane including the reference axis ray is defined as a Y-axis (a positive direction of which is a direction including a component of a direction in which the reference axis ray reversely traced from the origin is bent by said first optical acting surface), wherein said first optical acting surface is of a rotationally asymmetric, aspherical shape only one symmetry plane of which is a plane including the reference axis ray, and satisfies the following conditions (D), (E), and (F):

$$1.0 \leq r1Lui/r1Lvi \leq 2.0 \quad \text{(D)}$$

where an azimuth direction in which an absolute value of a local curvature radius is maximum, out of local curvature radii in all azimuth directions in a tangent plane around a normal to the tangent plane on an arbitrary point i in a ray effective range of said first optical acting surface, is defined as a ui axis, an azimuth direction normal to the ui axis is defined as a vi axis, a local curvature radius in the direction of the ui axis at the arbitrary point i is defined as r1Lui, and a local curvature radius in the direction of the vi axis as r1Lvi;

(E) when an angle of the ui axis with respect to the symmetry plane is θ1i, absolute values of the θ1i increase monotonically from the near side to the far side with respect to the symmetry plane at arbitrary points on an intersecting line between the first optical acting surface and a plane normal to the symmetry plane and including the Z-axis or parallel with the Z-axis;

(F) the θ1i satisfies the following relation:

$$0 \leq E1i \leq 21°$$

provided that r1Lui/r1Lvi=1 and θ1i=0° if there exist two or more azimuth directions in which the absolute value of the local curvature radius is maximum and that the θ1i is positive in a clockwise direction on the right side of the symmetry plane while being positive in a counterclockwise direction on the left side of the symmetry plane where said first optical acting surface is viewed from the origin side with the positive direction of the Y-axis up.

7. The optical system according to claim 6, further comprising:

an optical element comprised of a transparent, optical material having said first optical acting surface, said second optical acting surface, and a third optical acting surface, wherein the light from the original picture is incident through said third optical acting surface into said optical element, then is reflected successively by said second optical acting surface and by said first optical acting surface, and thereafter is emergent out of said second optical acting surface.

8. An image viewing apparatus comprising:

a display device for displaying an original picture; and the optical system of any one of claims 4 to 7.

* * * * *

UNITED STATES PATENT AND TRADEMARK OFFICE
CERTIFICATE OF CORRECTION

PATENT NO.    : 6,292,301 B1
DATED         : September 18, 2001
INVENTOR(S)   : Junko Kuramochi et al.

It is certified that error appears in the above-identified patent and that said Letters Patent is hereby corrected as shown below:

Column 2,
Line 59, "of which" should read -- which --; and
Line 62, "of which" should read -- which --.

Column 3,
Line 61, "Eli" should read -- $\theta$li --.

Column 4,
Line 5, "p resent" should read -- present --.

Column 5,
Line 58, "drawing" should read -- drawing for --.

Column 6,
Line 20, "$\leq \theta 2 \leq 35°$" should read --$0° \leq \theta 2i \leq 35°$--;
Line 37, "$1.0 \leq r1Lui/r1Lvi \leq 2.0$" should read --$1.0 \leq r1Lui/r1Lvi \leq 2.0$     (D)--; and
Line 61, "$\theta$li 0°;" should read --$\theta$li = 0°;--.

Column 9,
Line 8, "O" should read -- Oi --; and
Line 37, "$20x^2y^2$" should read -- $20x^2y^3$ --.

Column 13,
Line 3, "S1" should read -- S2 (transmitting) --;
Line 13, "S1" should read -- S2 (reflecting) --;
Line 46, "A(deg) -4.5321" should read -- A(deg) -4.8321 --;
Line 58, "S1" should read -- S2 (transmitting) --; and
Line 63, "10.307" should read -- 16.171 --.

Column 14,
Line 4, "S1" should read -- S2 (reflecting) --;
Line 51, "S1" should read -- S2 (transmitting) --; and
Line 58, "S1" should read -- S2 (reflecting) --.

Column 15,
Line 10, "$c^4$ -8.83 E-05" should read -- $c^4$ -8.83E-06 --;
Line 13, "-1.81E-01" should read -- 1.81E-11 --;
Line 35, "S1" should read -- S2 (transmitting) --;
Line 43, "S1" should read -- S2 (reflecting) --; and
Line 62, "-2.25E-07" should read -- 2.28-07 --.

UNITED STATES PATENT AND TRADEMARK OFFICE
CERTIFICATE OF CORRECTION

PATENT NO.    : 6,292,301 B1
DATED         : September 18, 2001
INVENTOR(S)   : Junko Kuramochi et al.

It is certified that error appears in the above-identified patent and that said Letters Patent is hereby corrected as shown below:

Column 16,
Line 26, "S1" should read -- S2 (transmitting) --; and
Line 34, "S1" should read -- S2 (reflecting) --.

Column 17,
Line 45, "$0°<\theta2<35°$" should read --$0°<\theta 2i<35°$--.

Column 19,
Line 14, "$0°<\theta 1i \leq 21°$" should read --$0°<\theta 1i<21°$--;
Line 59, "$1.0 \leq r2Lui/r2Lvi \leq 12.0$" should read -- (A) $1.0 \leq r2Lui/r2Lvi \leq 12.0$ --; and Line 61, "(A)" should be deleted.

Column 20,
Line 15, "$0° \leq \theta_{2i} \leq 35°$" should read --$0° \leq \theta 2i \leq 35°$--.

Column 21,
Line 38, "$1.0 \leq r1Lui/r1Lvi \leq 2.0$" should read --(D) $1.0 \leq r1Lui/r1Lvi \leq 2.0$--, and "(D)" should be deleted.

Signed and Sealed this

Twenty-second Day of October, 2002

Attest:

JAMES E. ROGAN
Attesting Officer
Director of the United States Patent and Trademark Office